United States Patent Office 2,869,943
Patented Jan. 20, 1959

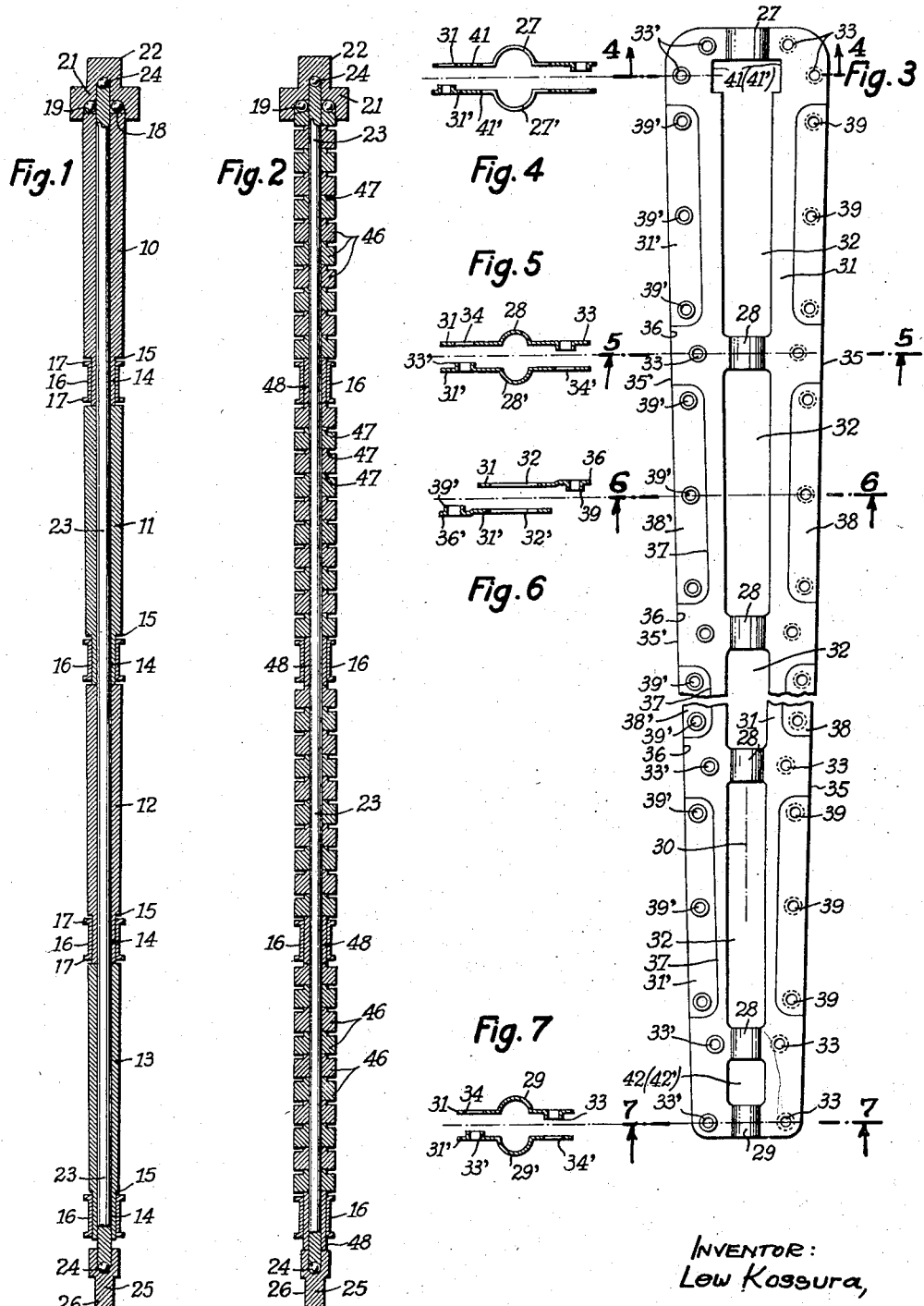

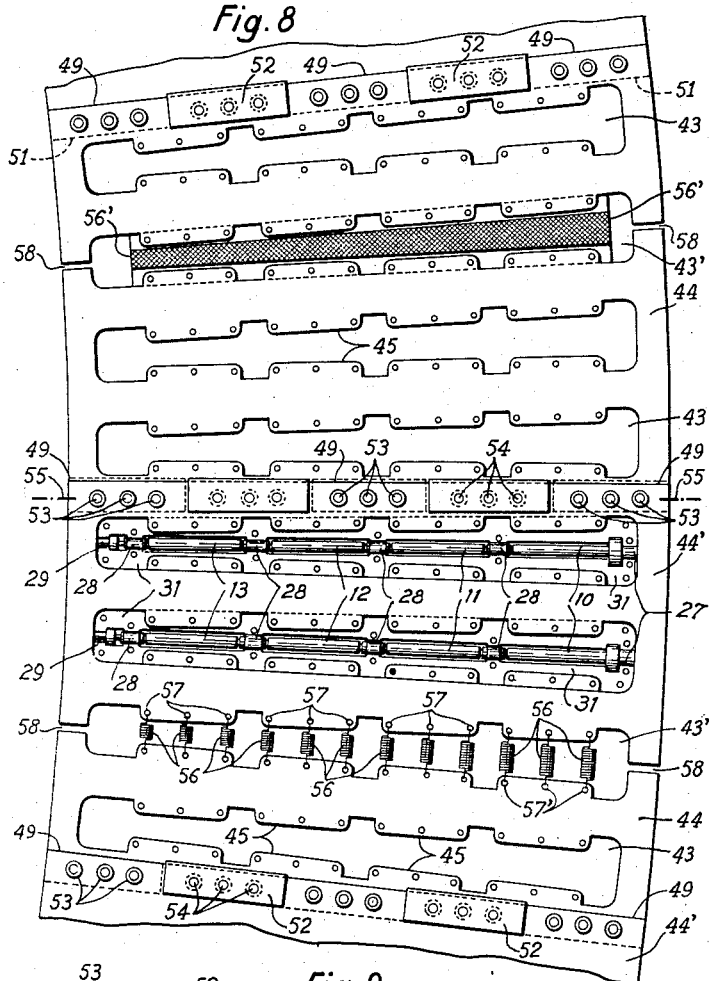
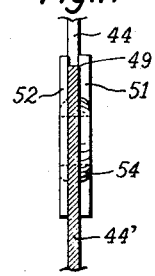
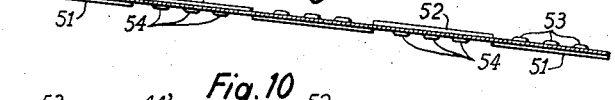
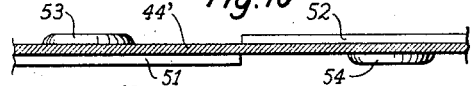
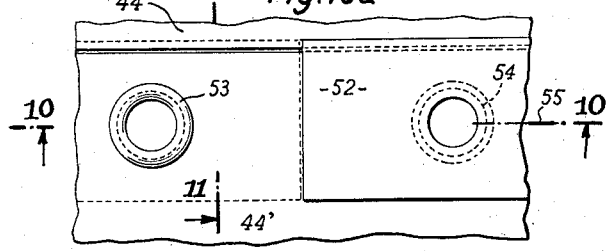

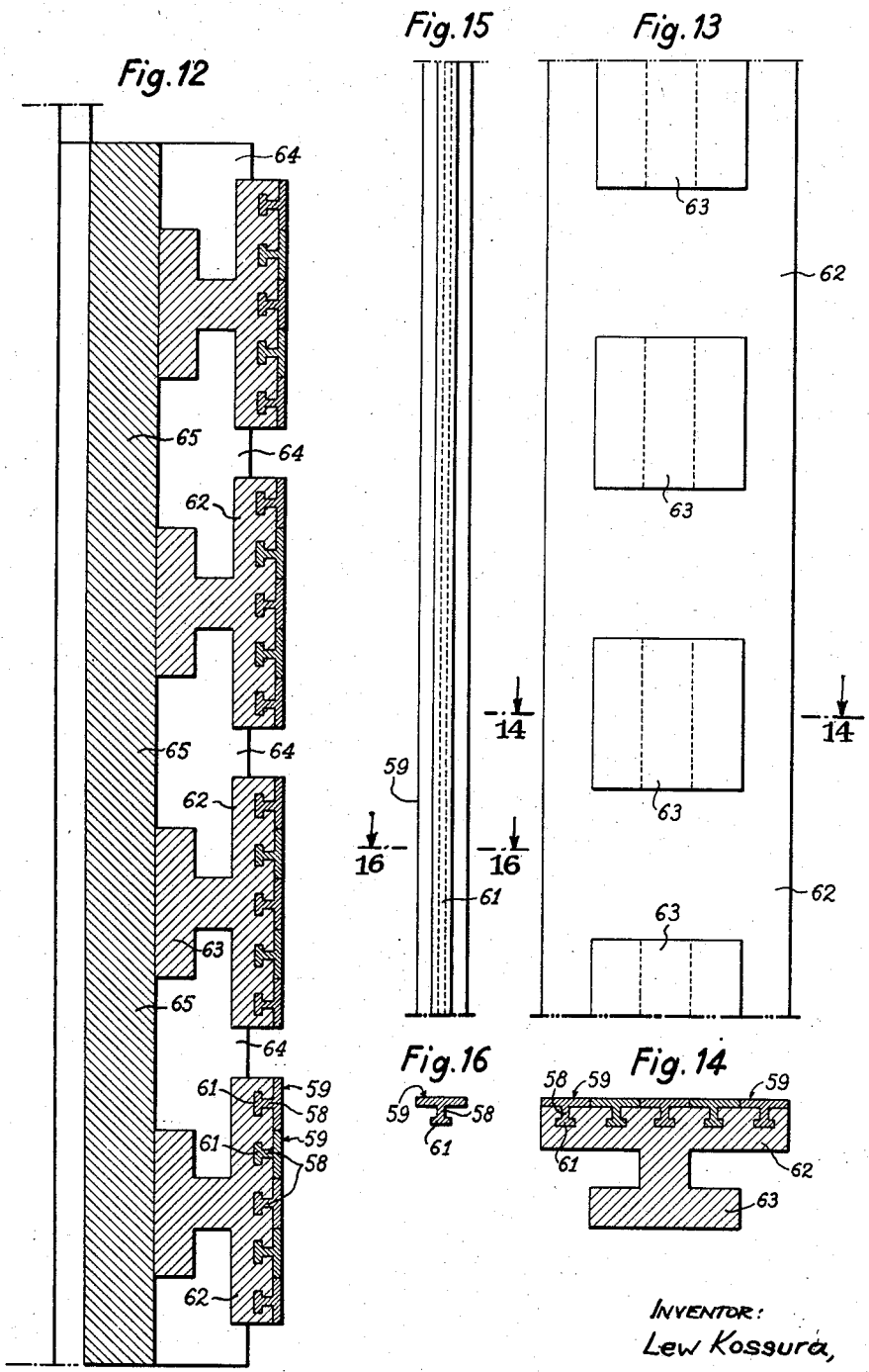

2,869,943

THRUST ROLLING-BEARINGS OF LARGE DIAMETERS

Lew Kossura, Troyes, France

Application April 22, 1952, Serial No. 283,704

Claims priority, application France May 10, 1951

7 Claims. (Cl. 308—235)

The invention relates to rolling bearings of large dimensions.

This invention has for its object to provide a conical rolling bearing of large diameter that can center and take up axial forces and is suitable for rotation of very heavy parts about a vertical shaft which, however, may be oblique in some constructions.

These conditions, which hold for example in hydraulic turbo-alternators, are also involved in the construction of heavy tonnage helicopters.

In said cases, like in analogous cases, the difficulties that exist in all rolling bearings on account of speeds of rotation, centrifugal forces and loads to be supported, are brought to their maximum since the centering and thrusting functions are to be obtained with an assembly corresponding to a single bearing, whereas the horizontal shafts may be supported by several bearings.

Heavy loads require a greater number of balls and their replacement by multiple rollers or by composite needles as in needle-bearings.

The multiplication of these parts is itself sufficient to create the necessity of distributing them in zones of both larger and larger diameters and surfaces.

It results therefrom that if the maximum diameter of rollers or needles, conical in shape, must remain small in order that a larger number of them may be disposed radially all around the axis of rotation, it is not possible at the same time to increase rotation, it is not possible at the same time to increase the length of each part without incurring serious inconveniences due to the fragility of these parts subjected to multiple torsional stresses and lateral flexures, however small. The difficulty due to the radial evolution of the needles is accompanied by difficulties which arise from the establishment of the annular runways on which these needles must roll.

Such parts would have a prohibitively great weight.

The arrangement according to the present invention is free from these inconveniences by providing for the use of thrust rolling-bearings with annular conical rolling surfaces between which the elements forming composite needles are disposed by radial assemblies in cages adapted to maintain in position the rolling elements-cones, cylinders, or balls, disposed along the same radius and which receive, and transmit to an element supporting these cages, the radial reactions of an individual rolling element as well as those of several rolling elements applying, in the common direction, against one another between the thrust points in each cage.

The annular conical runways are composed of elementary runway steel strips, the location and width of which correspond to the dimensions of the composite needle elements and which, while being held in position, are embedded in a convenient light metal alloy except the rolling surfaces of said steel strips which remains out of said embedding. The runways are thus formed to concentric circular arcs interconnected along their circumferences by approaching beveled ends thereof, each interconnection being circularly off-set from one elementary runway to another so that the radially disposed composite needle elements are affected by each cutting-off only locally, on a short portion of their length and not simultaneously on all this length.

Finally, rolling bearings of very large diameters carried out with elements of small diametral dimensions would result in quite prohibitive angular speeds of rotation of these elements.

This is remedied, according to the invention, by superimposing several stages of rolling bearings separated by conical frustum-shapes runway annuli, free to rotate with a more reduced speed under the actions of the rolling bearings upon their two faces.

In this way, with a certain number of rolling stages, the value of angular speeds will be conveniently divided, while a very large number of bearing points will be maintained owing to the reduction in diameter of the rolling elements.

In order that the invention may be more clearly understood, the same will now be described with reference to the accompanying drawings in which:

Fig. 1 is a longitudinal sectional view of a form of needle composed of conical elements abutting against one another and supported on a common axle;

Fig. 2 is a longitudinal sectional view, similar to Fig. 1, but showing a modified needle of cylindrical form and constituted by a plurality of similar short rollers supported on a common axle, with guiding and axial thrusting means;

Fig. 3 is a fragmentary plan view of a plate assembled to hold in position the elements of a composite needle, for instance of Fig. 1;

Fig. 4 is a sectional view, taken on the line 4—4 of Fig. 3;

Fig. 5 is a sectional view, taken on the line 5—5 of Fig. 3;

Fig. 6 is a sectional view, taken on the line 6—6 of Fig. 3;

Fig. 7 is a sectional view, taken on the line 7—7 of Fig. 3;

Fig. 8 is a fragmentary plan view of a portion of the matrix of conical frustum shape formed of interconnected plates, and means for elastically interconnecting the various parts of said matrix;

Fig. 9 is an end elevational view of the matrix portion of Fig. 8;

Fig. 10a is a large scale fragmentary plan view of a portion of the assembly of Fig. 8, between the consecutive sectors of that matrix;

Fig. 10 is a large scale sectional view taken on line 10—10 of Fig. 10a;

Fig. 11 is a sectional view, taken on line 11—11 of Fig. 10a;

Fig. 12 is a fragmentary large scale sectional view of an exemplified runway in accordance with the invention;

Fig. 13 is a large scale plan view of the underside of a composite runway rail;

Fig. 14 is a sectional view, taken on line 14—14 of Fig. 13;

Fig. 15 is a plan view of an elementary rail shape, forming part of the structure of the composite rail of Figs. 13 and 14;

Fig. 16 is a sectional view, taken on line 16—16 of Fig. 15; and

Fig. 1 shows an example of the rolling parts of a composite needle having a taper ratio such that their rolling axes converge towards a virtual apex on the axis of rotation of the bearing.

Figure 17:
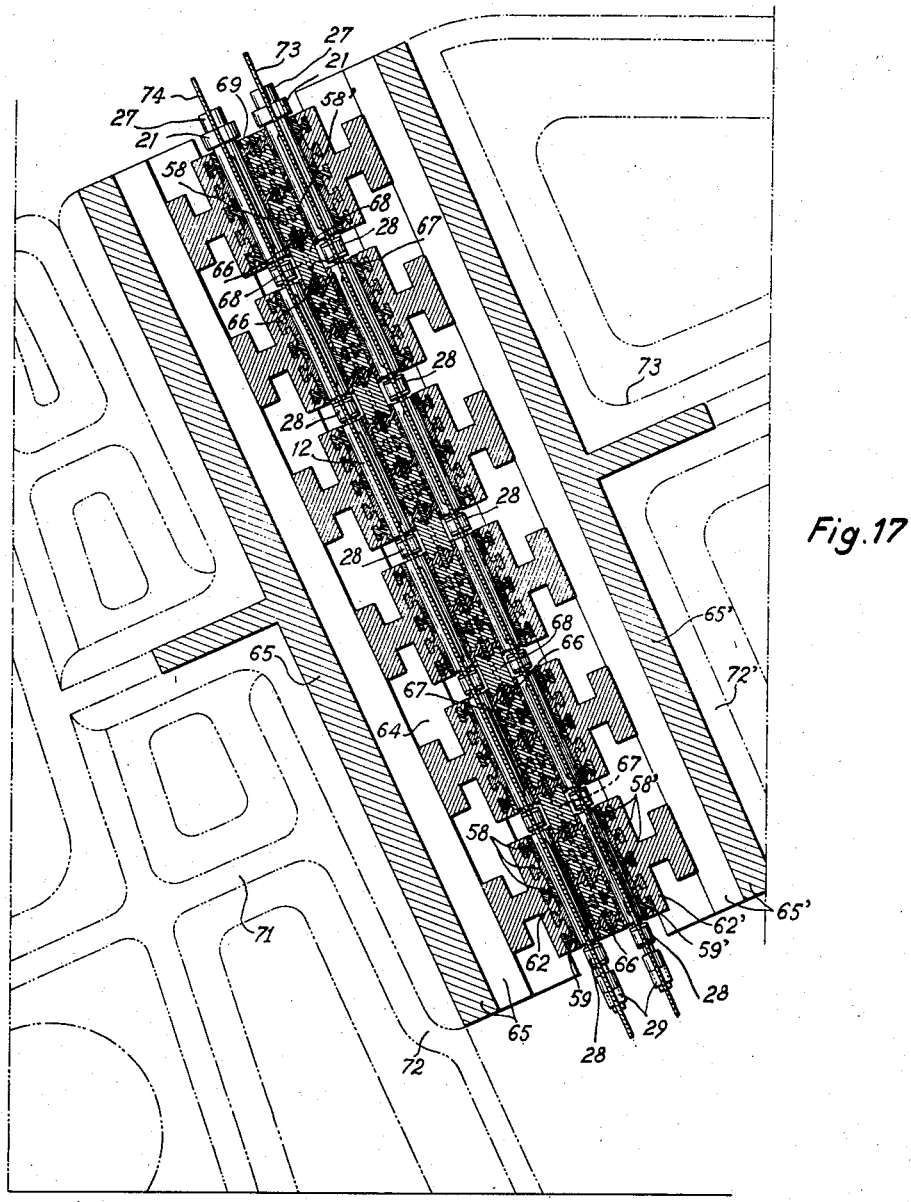
Fig. 17 is a sectional view through a radial plane and shows an annular rolling arrangement and a cone of intermediate conical bearing arrangement, positioned between a stationary frame portion and an annular rotor portion.

On account of the great length of such needles, and because of potential buckling of the body of an excessively tapered single needle, the conic needle is divided into several uniformly conical elements 10, 11, 12 and 13, of equal or unequal length, locally supported, between two consecutive elements by means of cylindrical necks 14, coaxially extending each from a shoulder 15, the necks 14 passing through sleeves 16 having their ends flanged as at 17.

The abutment of the necks 14 on the top of the next needle element transmits the thrust to another one, in the axial sense of the needle thus constituted.

The outermost needle element 10 has its top section 18 forming a runway for the balls 19 of a ball bearing 21 coaxial with the needle, said ball bearing 21 being provided with a shouldered cylindrical extension 22.

All these elementary needles have a common cylindrical through-bore into which there is inserted a common cylindrical axle 23 rotatably abutting at its two ends located respectively in the thrust bodies or bearings 22 and 25, against two balls 24. The needles are thus rotatably held longitudinally between the end thrust bearings 22 and 25.

The thrust body 25, the nearest to the bearing centre, comprises a shouldered cylindrical part 25, in which the axle 23 is pressed against the thrust ball 24 located in a coaxial bore. The shouldered part 25 terminates in a cylindrical coaxial extension 26.

The sleeves 16 and thrust bearings 22 and 25, are maintained fixed in half-collars 27, 27', 28, 28', 29, 29' (Figs. 5 to 10, inclusive), stamped in alignment with the axis 30 in half-plates 31, 31' similar to each other. These half-plates are cut out of and stamped from thin sheet metal, for example steel, and are provided with apertures 32, 32'. These apertures are disposed along the axis 30, between the half-collars 27, 28, 29 and the half-collars 27', 28', 29', and the rounded surfaces of the needle elements 10, 11, 12, 13 protrude therethrough respectively. These half-plates 31 and 31' generally are flat and are secured to each other symmetrically with respect to the axis 30, by any suitable means, such for example as stamped round snags 33, 33' which are riveted into stamped holes 34, 34' that are made in each half-plate.

The edge 35 (35') of each half-plate 31 (31') is rectilinear, and disposed radially when it takes its position in the rolling bearing, whereas the edge 36 (36') has cutaways 37 (37') to which symmetrically correspond, in the edge 44' (44) of the opposed half-plate, stamped portions 38 (38') hollowed out to a depth equal to the half-thickness of the metal sheet that constitutes the half-plates 31, 31'; these hollows are provided with tubular snags 39 (39') whose role will be explained later.

The half-plates are further provided, at their ends, with cutaways 41 (41') and 42 (42'), suitable for housing the thrust parts 22, 25 (Fig. 1) the portions of smaller diameters 22, 26 of which are held between the half-bearings 27, 27' and 29, 29', respectively.

By disposing needle elements, such as shown in Fig. 1, between two half-plates such as described in conjunction with Figs. 3 to 7, and by introducing and pressing the tubular snags 33, 33' into the corresponding holes 34', 34, there is obtained a complex or composite needle assembly the needle elements of which are held in operative position by means of abutments and bearings spaced along the needle axis, between the two symmetrically disposed stationary half-plates 31 and 31'.

Such composite or complex needles are shown in Fig. 8, positioned in the radial cutaways 43 made in a metal sheet 44 forming a part of the conic frustum shaped annulus called the matrix. The complex needles are mounted in their assembled plates that are secured to the matrix 44 by assembling, in the stamped portions 28, 28' of the half-plates 31, 31'. The portions 45 cut out in the sheet 44, protrude inwardly into the cutaways 43 and correspond to the stamped cutaways 38, 38' and receive the hollow snags 39, 39' in corresponding quincuncial holes into which these snags are pressed.

Without departing from the scope of the invention, the assemblage of the half-plates 31, 31' with the sheet 44 may be affected by any other convenient means such as by individual riveting, welding, or the like.

Shown in Fig. 2 is a modified form of the rolling elements of complex needle of the preceding type, but in which the conical elements supported on the axle 23 subjected to thrust at its ends are replaced between the sleeves 16 by a plurality of cylindrical rollers 46. The rollers 46 are of short axial length, and are provided with intermediate heels 47, the axial reactions being transmitted, from one group of rollers to another, by tubular braces 48 and by contacts of the consecutive heels 47, and at the outer end by a thrust ball bearing 21 as previously described.

This modified form (Fig. 2) has the great advantage in that it can be standardized since its rollers are similar to one another and fabricated in very large quantities.

Shown in Fig. 8 is the way of assembling a certain number of sector elements 44, the assembly of which in the form of a conical circular annulus constitutes a rolling cage or matrix of large diameter with numerous long complex needles maintained in position radially. Two adjacent sectors 44 and 44' are secured to each other, between two cutaways 43, by engagement of the even edge 49 into the cutaways 51, 52 (Fig. 8) and by tubular rivets 53 and holes 54 spaced along a radial fitting line 55, the cutaways 52 located on one edge of the sector 44, being offset alternately, by any convenient means, through a one-half-thickness of the metal sheet, for the purpose of being riveted or welded to the even edge of the adjacent sector 44'. The tubular rivets 53 on the notched parts and the holes 54 on the straight edge are obtained by stamping them into correspondence with one another (Figs. 10, 10a, 11).

The rolling cages of this type, with large dimensions, may be provided with elastic joints 56, 56' assisted by cuts 58 made, for example, along the axis of a cutaway 43'. They are not provided with any plate and rolling complex needle but are provided, between the holes 57, 57' facing one another on each side, with springs 56 in sufficient number and capable of always tending to close the ends 58, these springs having their outer dimensions smaller than those of the needles or balls of the rolling cage under consideration. A further way of making an elastic joint of equal efficiency consists in fixing between the holes 57, 57', a rubber piece 56', of convenient thickness, the edges of which are provided with metallic lining having fastening holes and corresponding rivets.

The above dispositions permit, with a minimum of weight and with the aid of elementary parts machined as by stamping according to standard specifications and hence fabricated in large quantities, of constructing large rolling cages to maintain in position a large number of complex needles.

A further important feature of the invention is the construction of large raceways or runways fulfilling, with a smaller weight, the desired conditions for receiving the rolling elements of the aforesaid kind.

A runway of this kind is shown in Figs. 12, 13, 14, 15, 16 and comprises a number of elementary circular arc-curved rails 58, preferably in special hard steel, of composite profile comprising a large heel 59 and narrower heel ribs 61. The parts are arc-curved and assembled together by being grouped and embedded into a light metal support sole or flange 62, the heel portions 59 being concentric and butt-joined, and the various profile lengths entering into each circle having their junctions beveled and angularly shifted on this circle.

The soles 62, circularly continuous, are concentric with one another and correspond to the radial divisions of the complex needles having to roll on the runways, of corresponding width, constituted by the heels of small butt-joined parts 59.

These soles 62, integral with slide heels 63, are circularly spaced a distance such as to allow easier assemblage with link heels 64 belonging to the fixed runway or to the rotor supporting runway and circularly spaced the same distance as are the opposite heels 63.

The engagements of parts 63 with parts 64 is then effected by laterally sliding the composite rail through said distance, the locking being effected with the aid of appropriate keys (not shown) introduced into the space between the parts 63—64.

The soles 62, 63 will be cast from light metal, the parts 61 being held in position by means of convenient templets and embedded thereinto. These parts 61 will be made of special steel such as to impart to the metal of the composite rail a convenient tensile strength.

The surface (curved or plane or provided with circular grooves) formed by the heel portions 59 of elementary rails 58 will be machined, so as to obtain a correct rolling surface, by any abrasing or grinding means forming no part of the present invention.

With a conical rolling cage hereinabove described, having complex needles and disposed between two conical rolling surfaces, one being convex and the other concave, the cones of said rolling surfaces being the same in the case of cylindrical needles and concurring with the cone of needle axes, in the case of conical needles, in a same apex on the axis of rotation, there is obtained a complete rolling bearing.

As has been stated, such rolling bearing, in view of its large diameter and of the necessarily small diameter of the complex needles, may impart to the latter inadmissible speeds of rotation and necessitate one or several 2-face runways located each between two successive cages.

Shown in Fig. 17 is an example of an intermediate conical frustum-shaped annulus of mixed steel and light metal composition according to the principles above set forth.

A radial metal sheet armature or section 66 is provided, which is of a conic frustum-shaped surface suitable for carrying out an annulus-armature adapted to be comprised between two rolling sets with complex needles according to the invention. Upon this metal sheet 66, pierced with a plurality of holes 67 for alleviation and introduction of binding alloy 68, there are disposed, at the fabrication of said annulus armature, by groups, the elements of circular steel rails 58 resting on the perforated armature 66 and maintained in position with the aid of provisional ligatures with their external surface on the desired surfaces of conical templets. The steel parts 58 are made rigid into a single conic frustum-shaped annulus 69 by pouring into the annulus body 68 light metal which, distributed through holes 67 on both faces of 66, rigidly connects the parts 58 and 58' with the central armature 66 and thus forms a light annulus with runways 59, 59' lined with superficially quenched steel, at useful points.

Of course, the faces 59 and 59' will be ground by appropriate means so as to form smooth runways of taper in conformity with that of the needles.

Shown in Fig. 17 is a double rolling-arrangement, with conical needles, for instance according to Fig. 1.

The upper runway is supported on a radial framework 71, shown in dash-and-dot lines, through the intermediary of circular T-like parts 65 that have flanges and webs, applying against skids 72 and receiving through intakes 64 the circular composite light metal parts 62 supporting the elementary steel parts 58 forming the surface 59 of the rotor of a rotating means.

The lower runway is supported similarly on circular elements 65' and the skid 72' on the fixed framework 73.

Between these two runways 59 and 59' there are disposed, upwardly, a first rolling cage 73, with its complex needle, a 2-face conic frustum-shaped rolling surface 69 of the kind afore described and a second rolling cage 74 with its composite or complex needles.

There is thus obtained the reduction by one-half of the angular speed of the same needles rotating on their axles in a simple rolling-arrangement having the same diameters of runways.

When the diametral dimensions are limited for example to about three feet, then the principal or intermediate conical rolling surfaces, as well as the cages, maintaining in position the complex needles made of elementary rollers or balls, are formed, preferably by stamping, generally from a single conic frustum-shaped hard metal piece with circular hollows or protrusions for the runways and with local apertures or closures for the caged rolling elements.

The principal rolling surfaces will further be reinforced by means of external supports and constituted by casting light metal onto stamped elements or by assembling machined light metal pieces with the said conic frustum-shaped surfaces. The fact that the latter are in one single very hard metal piece permits of simplified machining and imparts special solidity to their assemblage with a light metal support.

The invention is not restricted to the particular constructions and arrangement of parts, herein described and shown, as the same may be modified in various particulars without departing from the spirit and scope of the invention.

What I claim is:

1. In a rolling contact bearing of the thrust type, in combination, a large diameter raceway structure, for use with a plurality of anti-friction rolling elements having their axes disposed on a conical surface, said raceway structure comprising an annular beam including a flange and a web, the upper face of said flange being curved defining an endless conical surface forming a portion of said raceway, the flange and web of the beam of said raceway portion having a small thickness and being composed of hard metal, and a second portion connected thereto and composed of light weight metal different from said hard metal and having a thickness and shape sufficient to restrain deformation of said conical raceway under the thrust action of said elements.

2. In a rolling contact bearing of the thrust type, in combination, a large diameter raceway structure, for use with a large series of anti-friction elements having their axes disposed on a conical surface, comprising a plurality of first portions each composed of an annular beam including a flange and a web, the upper face of said flange being curved defining an endless conical surface forming a portion of said raceway, the flange and web of the beam of each first portion having a small thickness and being composed of hard metal, and a second portion composed of light weight metal different from said hard metal, said light weight second portion being connected to said first portions, said conical raceway surfaces being flush with the surface of said light weight portion, said light weight portion having a thickness and shape sufficient to restrain deformation of said raceway under the thrust action of said elements.

3. In a rolling contact bearing of the thrust type, in combination, a large diameter raceway structure comprising a first portion composed of light weight metal and at least one thin second portion composed of hard metal embedded in said first portion and defining annular conical raceway surface sections flush with the surface of said first portion, and a plurality of anti-friction rolling needles, each needle disposed radially of said structure and comprising a series of aligned adjoining rolling members, each member of a needle being in rolling contact with a conical raceway surface section and journalled with the adjoining members of the same needle, and a cage for said needles comprising a ring having radial cut-outs, two sheet metal members for each needle, said sheet metal members being connected at said cut-outs to said ring and being operable to journal and maintain radially in alignment said rolling members of each needle.

4. In a needle bearing of the thrust type, in combination, a large diameter raceway structure having a light metal body and hard metal raceway forming members embedded therein, a plurality of composite long needles, each needle comprising a plurality of rolling members aligned on the needle axis, a cage operable for supporting said members comprising a ring having radial cut-outs, two sheet metal members for each needle, said sheet metal members being connected at said cut-outs to said ring and being operable to journal and maintain in alignment said rolling members of each needle, each element of a needle being tapered defining together with the other members thereof a composite needle taper.

5. In a needle bearing of the thrust type, in combination, a large diameter raceway structure having a light metal body and hard metal raceway forming members embedded therein, a plurality of composite needles, each needle comprising a series of rolling members aligned on the needle axis, an annular cage supporting said needles including a rod for each needle connected to said cage and disposed radially thereof, said cage comprising a ring having cut-outs, a pair of sheet metal members for each ring connected to said ring at said cut-outs and forming bearing surfaces for said rod, each rolling member being hollow, and said rolling members of each needle surrounding a rod and being aligned thereon and having tapered surfaces defining a needle taper.

6. In a needle bearing of the thrust type, in combination, a large diameter raceway structure having a light metal body and hard metal raceway forming members embedded therein, a plurality of needles, each needle comprising a series of rolling members aligned on the needle axis, said axes being disposed in said thrust bearing on a conical surface, and a ring shaped cage for supporting said members on the needle axis comprising a plurality of peripherally adjoining segments completing the ring shape, and resilient means intermediate said segments for connecting the same elastically.

7. In a rolling contact bearing of the thrust type, in combination, two structures defining oppositely disposed conical raceways, a thin intermediate structure having two opposite parallel conical surfaces and defining at least one raceway on each of the two surfaces and being disposed intermediate said first named structures, the conical raceways of the intermediate structure being opposite those of said first named structures, and a plurality of rolling contact elements radially arranged between the surfaces of said structures, each element comprising a series of radially aligned members forming a composite needle, and a cage for said needles comprising a plurality of pairs of sheet members each pair journalling one needle, each raceway structure being composed of light weight metal and having raceway forming members embedded therein composed of hard metal.

References Cited in the file of this patent
UNITED STATES PATENTS

| | | |
|---|---|---|
| 799,765 | Tweeden | Sept. 19, 1905 |
| 829,502 | Buhoup | Aug. 28, 1906 |
| 845,632 | Gurney | Feb. 26, 1907 |
| 1,300,386 | Hart | Apr. 15, 1919 |
| 1,353,044 | Keiper | Sept. 14, 1920 |
| 2,057,213 | Skyiepal | Oct. 13, 1936 |
| 2,117,633 | Smith | May 17, 1938 |
| 2,149,009 | Cheivitz | Feb. 28, 1939 |
| 2,417,559 | Larson | Mar. 18, 1947 |
| 2,627,228 | Bromley | Feb. 3, 1953 |